United States Patent
Barry (10) Patent No.: US 9,820,438 B2
(45) Date of Patent: Nov. 21, 2017

(54) SELF-ADJUSTING DECK PLATE OF AN AGRICULTURAL HARVESTER

(71) Applicant: CNH Industrial America LLC, New Holland, PA (US)

(72) Inventor: John T. Barry, Bel Air, MD (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/579,477

(22) Filed: Dec. 22, 2014

(65) Prior Publication Data
US 2016/0174463 A1     Jun. 23, 2016

(51) Int. Cl.
A01D 45/02     (2006.01)

(52) U.S. Cl.
CPC .................................. *A01D 45/021* (2013.01)

(58) Field of Classification Search
CPC ... A01D 45/021; A01D 45/023; A01D 45/025
USPC .............................................. 56/62, 119, 105
See application file for complete search history.

(56) References Cited

U.S. PATENT DOCUMENTS

| | | | |
|---|---|---|---|
| 3,101,579 A * | 8/1963 | Karlsson | A01D 45/021 56/105 |
| 3,126,690 A * | 3/1964 | Keller et al. | A01D 45/025 56/107 |
| 3,262,255 A * | 7/1966 | Karlsson | A01D 45/025 56/107 |
| 3,271,940 A * | 9/1966 | Ashton | A01D 41/141 56/105 |
| 3,589,110 A * | 6/1971 | Schreiner | A01D 41/142 56/106 |
| RE27,554 E * | 1/1973 | Ashton et al. | A01D 45/021 56/105 |
| 5,060,464 A * | 10/1991 | Caron | A01D 45/021 56/119 |
| 5,680,750 A * | 10/1997 | Stefl | A01D 45/021 56/119 |
| 5,878,559 A * | 3/1999 | Cooksey | A01D 45/023 56/104 |
| 5,878,561 A * | 3/1999 | Gunn | A01D 45/023 56/119 |
| 6,226,969 B1 * | 5/2001 | Becker | A01D 45/021 56/62 |

(Continued)

FOREIGN PATENT DOCUMENTS

EP     1133911 A1     9/2001

*Primary Examiner* — Arpad Fabian-Kovacs
(74) *Attorney, Agent, or Firm* — Peter K. Zacharias; Patrick M. Sheldrake (57) ABSTRACT

A row unit of an agricultural harvester is disclosed for the automatic adjustment of a gap size of the row unit stripping plates. The row unit includes first and second longitudinally extending stripping plates mounted on a frame and having opposed stripping edges which define a gap between them. The row unit further includes a gap adjustment mechanism for adjusting a size of the gap between the first and second stripping plates. The gap adjustment mechanism includes a control arm, a rocker assembly operatively connected to one of the first and second stripping plates and slidably connected to the control arm, and a biasing member for biasing the rocker assembly along the control arm toward a predetermined position corresponding to a predetermined gap size.

24 Claims, 6 Drawing Sheets

(56) References Cited

U.S. PATENT DOCUMENTS

| | | | |
|---|---|---|---|
| 6,237,312 B1 * | 5/2001 | Becker | A01D 45/021 56/119 |
| 7,913,480 B2 * | 3/2011 | Christensen | A01D 45/021 56/119 |
| 7,930,870 B2 | 4/2011 | Rottinghaus | |
| 8,196,380 B2 | 6/2012 | Carboni | |
| 8,220,235 B2 | 7/2012 | Kowalchuk | |
| 8,224,534 B2 | 7/2012 | Kowalchuk | |
| 8,402,727 B2 * | 3/2013 | Carboni | A01D 45/021 56/60 |
| 8,820,039 B2 | 9/2014 | Werning | |
| 8,863,487 B2 * | 10/2014 | Calmer | A01D 45/021 56/106 |
| 9,179,602 B2 * | 11/2015 | Vandeven | A01D 45/021 |
| 2008/0092507 A1 * | 4/2008 | Bollig | A01D 45/021 56/106 |
| 2011/0011048 A1 * | 1/2011 | Hoffman | A01D 45/023 56/119 |
| 2011/0146218 A1 * | 6/2011 | Carboni | A01D 45/021 56/62 |

* cited by examiner

SELF-ADJUSTING DECK PLATE OF AN AGRICULTURAL HARVESTER

BACKGROUND

The subject application relates generally to an apparatus for a header of an agricultural harvester, such as, but not limited to, a combine, windrower or the like. In particular, the subject application relates to a self-adjusting deck plate for a row unit of an agricultural harvester.

An agricultural harvester or combine typically employs headers such as a corn harvesting header that includes a series of row units which are identical to each other. Each row unit includes a pair of snapping rolls having a snapping slot formed between them. Gathering chains having gathering fingers guide corn stalks into the snapping slot. The snapping rolls pull the corn stalks through the snapping slot and the ears are removed from the stalks as they come into engagement with opposed edges of stripper plates or deck plates which bracket the slot between the gathering chains and the snapping rolls.

It is conventional for at least one of the two stripper plates to be mounted on the row unit frame for movement toward and away from the other stationary plate. This movement permits the gap between the opposing stripping edges to be varied to accommodate different corn crops and crop conditions. However, adjustment of the gap is typically accomplished by an adjusting mechanism that controls the plurality of row units of the header in unison which must be initiated by the user and which does not allow for individual row unit adjustments.

BRIEF SUMMARY

In accordance with a first aspect, the subject application provides a row unit of an agricultural harvester comprising first and second longitudinally extending stripping plates and a gap adjustment mechanism. The first and second longitudinally extending stripping plates are each mounted on a frame of the row unit and have opposed stripping edges which define a gap between them. The gap adjustment mechanism adjusts a size of the gap between the first and second stripping plates. The gap adjustment mechanism includes a control arm, a rocker assembly and a basing member. The rocker assembly is operatively connected to one of the first and second stripping plates and slidably connected to the control arm. The biasing member biases the rocker assembly along the control arm toward a predetermined position corresponding to a predetermined gap size.

In accordance with a second aspect, the subject application provides a row unit of an agricultural harvester having first and second longitudinally extending stripping plates and an adjustment mechanism. The first and second longitudinally extending stripping plates are each mounted on a frame of the row unit and have opposed stripping edges which define a gap between them. The adjustment mechanism is pivotably connected to one of the first and second stripping plates. The adjustment mechanism includes a control arm, a linkage assembly and a biasing member. The linkage assembly is connected to the control arm and pivotably connected to said one of the first and second stripping plates. The biasing member biases the linkage assembly along the control arm toward a predetermined position.

In accordance with another aspect, the subject application provides an adjustable deck plate for a row unit of an agricultural harvester. The row unit includes a stationary deck plate, a longitudinally extending deck plate and an adjustment mechanism. Specifically, the adjustable deck plate includes a deck plate arm connected to an adjuster bar. The clamp that the deck plate arm attaches to the adjuster bar is fixed in such a way that the position of said adjuster bar determines the position of the second deck plate and thus the gap between the two deck plates.

According to yet another aspect, the subject application provides a self-adjusting deck plate that keeps all existing hardware used to hydraulically adjust the deck plates on conventional corn headers and makes no or minor changes to this hardware. Specifically, the self-adjusting deck plate includes a deck plate arm connected to an adjuster bar that is loose, two stop clamps and a spring. The clamp that the deck plate arm attaches to the adjuster bar is configured to be loose so that the arm and deck plate move freely therebetween. Similar stop clamps are added to each side of the existing deck plate clamp. These stop clamps are tightened to the bar and are there to limit the range of motion of the deck plates. Specifically, they are set to allow an acceptable range of motion for the deck plates. An acceptable range of motion or acceptable range of gap sizing between the first and second stripping plates corresponds to a range of stalk widths known for a particular crop e.g., corn stalks. The spring is added between the loose clamp attached to the deck plate arm and one of the stop clamps. The spring allows the deck plate to move when a stalk impacts the deck plate and then returns the deck plate to its desired location.

This apparatus of the subject application will allow the deck plates to open if need be while keeping the deck plates tight together in order to prevent losses. It provides this benefit while allowing the operator to change the maximum and minimum spacing between the deck plates with ease by simply moving the two stop clamps.

Alternatively, the self-adjusting deck plate system can employ a tension spring between the right hand side stop clamp and the free moving clamp. This would allow for easier assembly, replacement or repair of the system.

Moreover, in conventional systems the corn headers have spring loaded deck plates. Such deck plates are configured with cams for each deck plate which also limit the movement of the deck plates. In order to then adjust the movement of the deck plates all such cams e.g., a plurality of cams, must be adjusted identically. That is, in conventional systems in order to adjust the movement of the deck plates all cams are typically required to be adjusted identically. To this end, the subject application can mitigate a requirement of identically adjusting all of the deck plate cams in order to adjust the movement of the deck plates.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
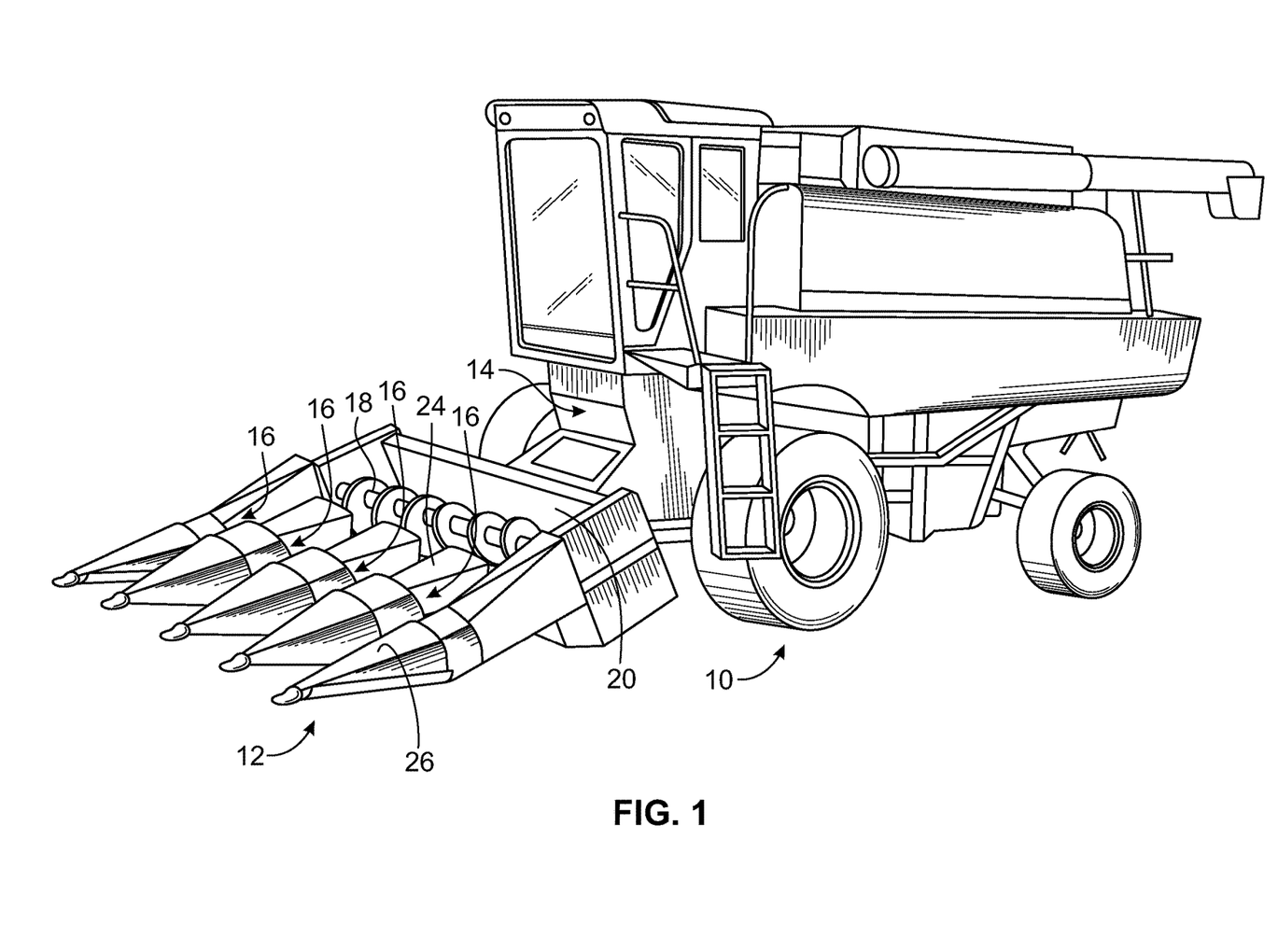
FIG. 1 is a perspective view of an agricultural harvester including a corn header applicable to the subject application.

Referring now to the drawings, and particularly to FIG. 1, an agricultural harvester or combine 10 is shown. A corn harvesting header assembly, header assembly or corn header 12 is mounted on combine 10, cantilevered in front of combine 10 and connected to the combine by a feeder assembly 14.

Header assembly 12 illustrated contains four row dividers 16, which harvest four rows of corn simultaneously. In other embodiments, the number of rows of corn that may be harvested may be different than four, for example greater than four or less than four. Ears of corn are stripped from each of the four rows by the header and then carried by an auger 18 in a trough 20 to the feeder assembly 14. Feeder assembly 14 carries the collected ears rearwardly and upwardly into a threshing assembly (not shown) in the body of combine 10.

Referring now to FIGS. 2-5, there is shown a row unit 22 of the agricultural harvester without its hood 24 or divider 26 for purposes of illustration. The general structure and operation of row units, except for the features of a self-adjusting deck plate in accordance with the subject application are known in the art and a detailed description of these structures, configuration and operation is not necessary for a complete understanding of the subject application. Row units applicable to the self-adjusting deck plate of the subject application are disclosed for example in U.S. Pat. Nos. 8,224,534 and 8,220,235, the entire disclosures of which are hereby incorporated by reference in their entirety for all purposes.

Each row divider or pair of row dividers includes a row unit 22 having first 28 and second 30 longitudinally extending stripping plates mounted on a frame 32. Stripping plates are also commonly referred to as deck plates. Each of the first and second longitudinally extending stripping plates have opposed stripping edges which defined a gap 34 between them. In the aspect shown in FIG. 2, the second stripping plate 30 is fixedly connected to the frame 32 while the first stripping plate is slidingly mounted on the frame. However, in alternative aspects, the second stripping plate can be slidingly mounted on the frame while the first stripping plate is fixed or both the first and second stripping plates can be slidingly mounted to the frame. The general structure and purpose of the stripping plates are known in the art and further described in U.S. Pat. Nos. 8,224,534 and 8,220,235.

The row unit 22 also includes a gap adjustment mechanism 36 for adjusting a size of the gap between the first and second stripping plates. The gap adjustment mechanism 36 is best shown in FIGS. 2-5 and includes a control arm 38, a rocker assembly 40 i.e., a linkage assembly, and a biasing member 37. The rocker assembly 40 is operatively connected to the first stripping plate and slidingly connected to the control arm 38 and the biasing member 37 biases the rocker assembly along the control arm toward a predetermined position corresponding to a predetermined gap size.

Figure 3:
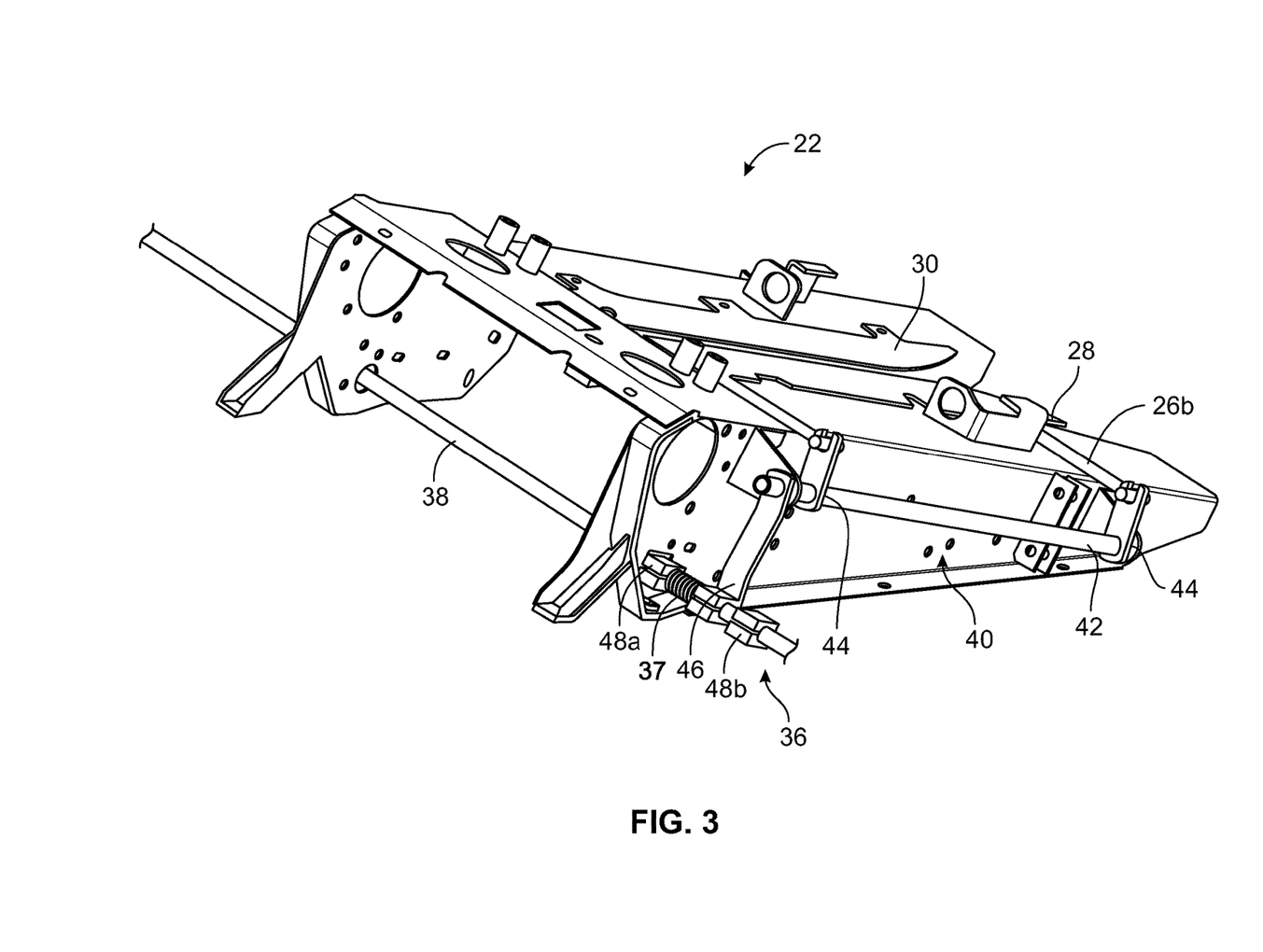
FIG. 3 is a rear perspective view of the row unit of FIG. 2.
Figure 3A:
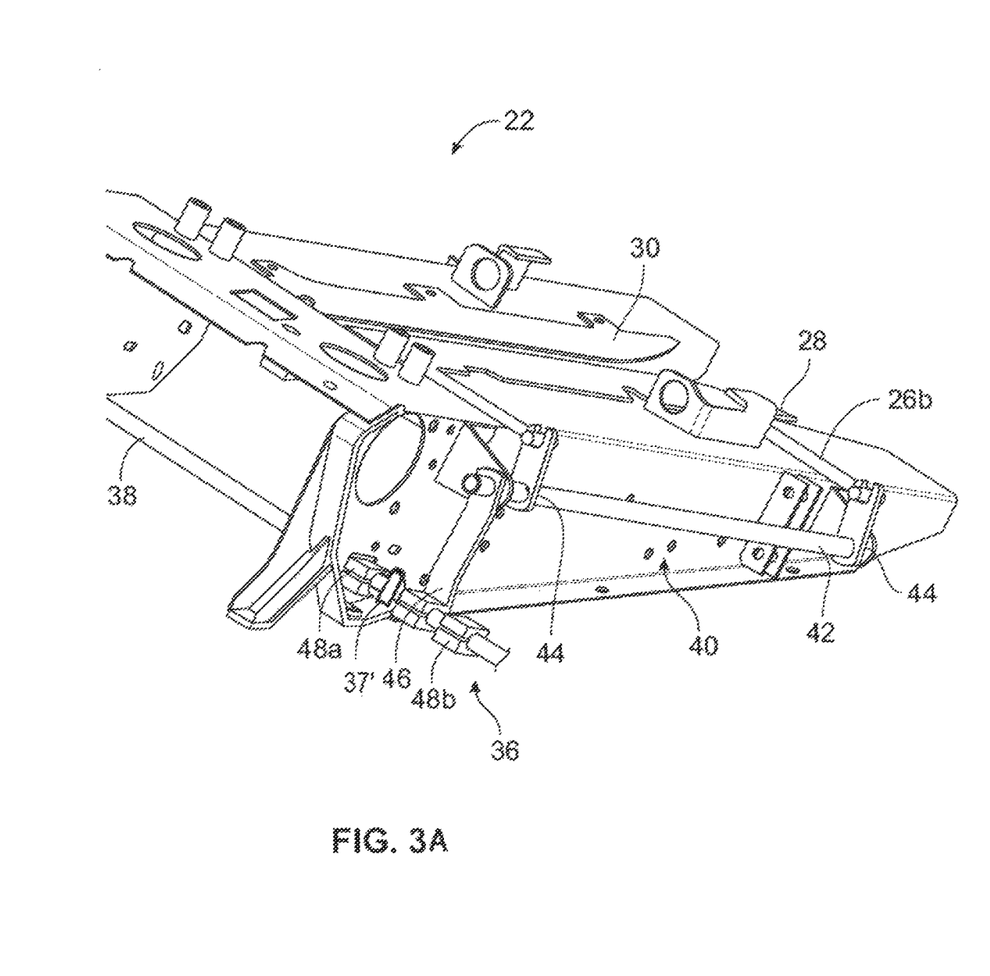
FIG. 3A is a rear perspective view of the row unit of FIG. 2 in accordance with another aspect of the subject application.
Figure 4:
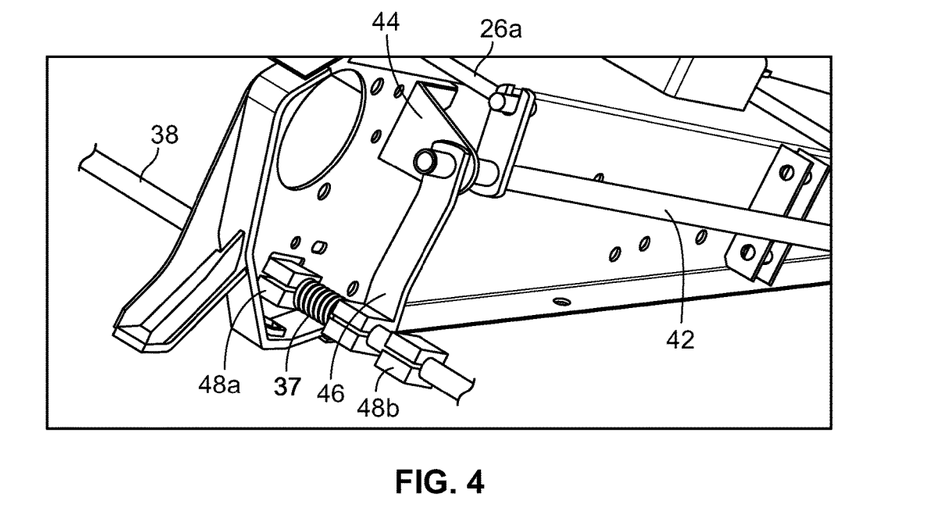
FIG. 4 is an enlarged partial rear perspective view of the row unit of FIG. 2.
Figure 5:
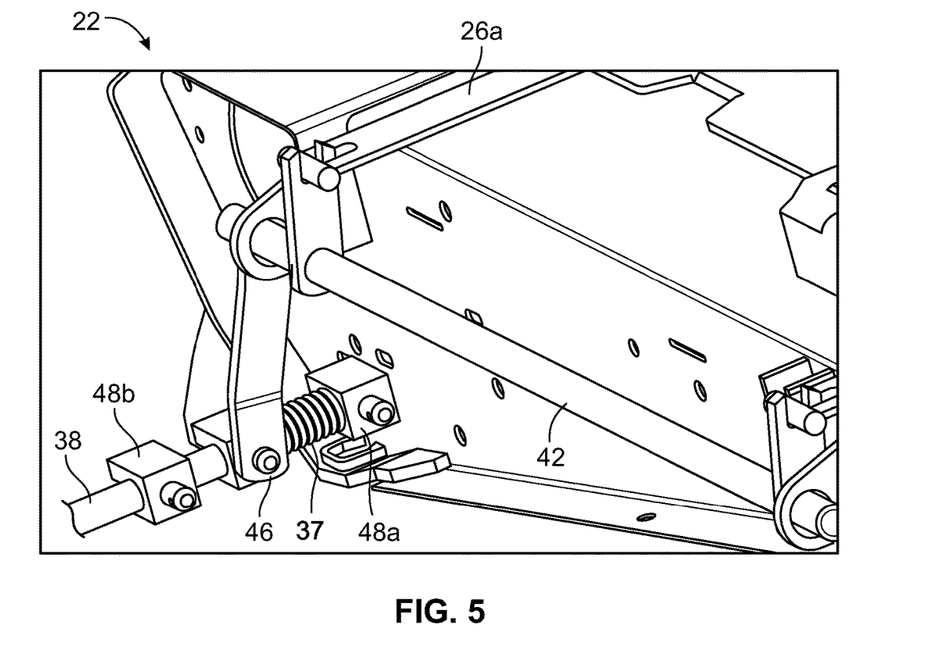
FIG. 5 is another enlarged partial rear perspective view of the row unit of FIG. 2.

The control arm 38 is a longitudinally extending member that extends transverse to the row unit. The control arm can also be configured to extend transverse across a plurality of row units of the header 12. In FIG. 3, the control arm is illustrated as a cylindrical shaft that extends substantially transverse to a longitudinal axis of the row unit about a rearward end of the row unit. In other words, the control arm extends in a direction substantially transverse to a longitudinal direction of the row divider or in a widthwise direction of the row divider.

The rocker assembly 40 includes a substantially U-shaped rocker shaft 42 about a lateral side of the row unit. The rocker shaft 42 is connected to the stripping plate 28 by a pair of extension members 26a, 26b extending from the stripping plate. Each extension member can be releasably attached or integrally formed with the stripping plate. At the ends of each extension member is an attachment member for attaching to respective ends of the rocker shaft 42. As illustrated, the attachment members are dowels for seating in a cradle at each end of the rocker shaft thereby providing a pivoting connection i.e., each extension member is pivotably attached to the rocker shaft 42.

The rocker shaft 42 is pivotably attached to the row unit by a pair of mounting brackets 44. Specifically, a longitudinal shaft of the rocker shaft extends through respective opening in the mounting bracket for rotation therein.

About a proximal end of the rocker shaft is an adjuster arm 46 that is rigidly connected about its first end to the rocker shaft 42 such that the adjuster arm moves in unison with the rocker shaft. The adjuster arm 46 has a second end or an attachment end 46a opposite the first end for attaching to the control arm 38. The attachment end 46a is configured to slidingly engage or connect to the control arm 38 such that the control arm can move within a predetermined length without causing the rocker shaft to pivot or vice versa, i.e., the rocker assembly 40 can pivot within a predetermined arc or length while the control arm is maintained in a fixed position.

The biasing member 37 or 37' can be any biasing member suitable for its intended purpose, e.g., a coil spring, a leaf spring, an elastomer, a magnet or the like. As illustrated in the present aspect shown in FIG. 3, the biasing member 37 is a coil spring circumscribing the control arm 38. As illustrated in another aspect shown in FIG. 3A, the biasing member 37' is a leaf spring, an elastomer, a magnet or the like.

The rocker assembly 40 further includes a pair of stops 48a, 48b spaced apart and positioned along a predetermined length of the control arm 38 about opposite ends of the adjuster arm 46. The predetermined length corresponds to a length sufficient to allow the rocker assembly to pivot and adjust the sizing of the gap between the first and second stripping plates so that the row unit can sufficiently and easily accommodate the crop being harvested. In other words, the predetermined length corresponds to an acceptable range of gap sizing between the first and second stripping plates.

The foregoing rocker assembly 40 is also referred to as a linkage assembly. As illustrated, the linkage assembly is connected to the control arm 38 and is pivotably connected to the first stripping plate, but can alternatively be connected to the second stripping plate or both of the first and second stripping plates. The linkage assembly includes first linkage 42 connected to the first stripping plate and second linkage 46 connected to the first linkage and the control arm. The second linkage is slidably connected to the control arm and rigidly connected to the first linkage.

As illustrated, the pair of stops is positioned about opposite sides of the adjuster arm 46 and the biasing member 37. The stops are each configured as a clamping member for rigidly attaching to the control arm but can alternatively be configured as any other stop(s) suitable for its intended purpose. While FIGS. 2-5 illustrate the biasing member 37 positioned between the first stop 48a and the adjuster arm, the biasing member can alternatively be positioned between the second stop 48b and the adjuster arm (along with corresponding linkage changes) or be directly attached to the adjuster arm about either its lateral or medial side.

The pair of stops is attached to the control arm such that each stop 48a, 48b is fixedly attached to the control arm 38 about a lateral side of the frame 32 of the row unit 22. This configuration allows the adjuster arm 46 to slide along the predetermined length of the control arm and be selectively biased by the biasing member.

Figure 6:
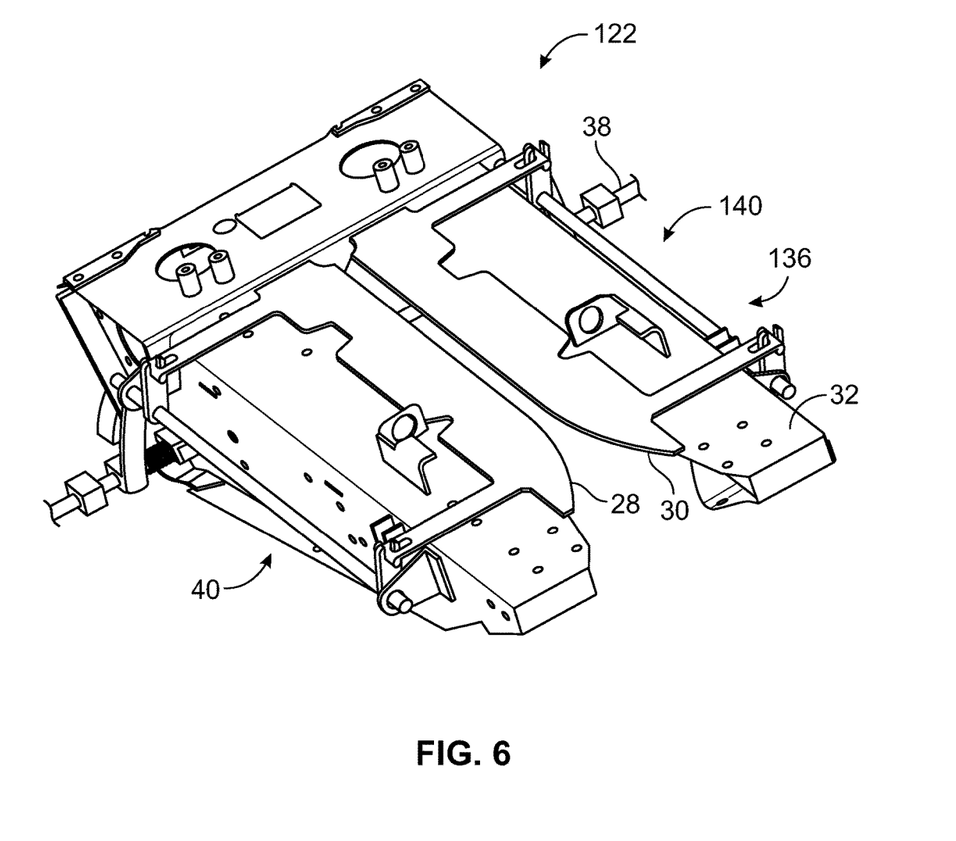
FIG. 6 is a perspective view of a row unit accordance with another aspect of the subject application.

Referring to FIG. 6, in an alternative aspect, a row unit 122 can include a gap adjustment mechanism 136 having a second rocker assembly 140 which is configured similarly to rocker assembly 40 but in a mirrored configuration. The second rocker assembly is operatively connected to the second stripping plate 30 in a manner similar to rocker assembly 40.

Referring back to FIG. 2, in operation, the row unit 22 is initially set with a predetermined gap 34 i.e., a predetermined position of the first and second stripping plates, and a predetermined amount of play for movement of the adjuster arm along the control arm 38. The predetermined gap is set by movement of the control arm to the desired position, which can be remotely controlled by the user from the combine cab, and in combination with the size of the biasing member and position of the stop 48a. Specifically, the positioning of the stop 48a and the biasing member 37 is configured such that the biasing member rests between the stop 48a and the adjuster arm 46 in an unbiased state when the first and second stripping plates are at the predetermined gap size position.

Figure 2:
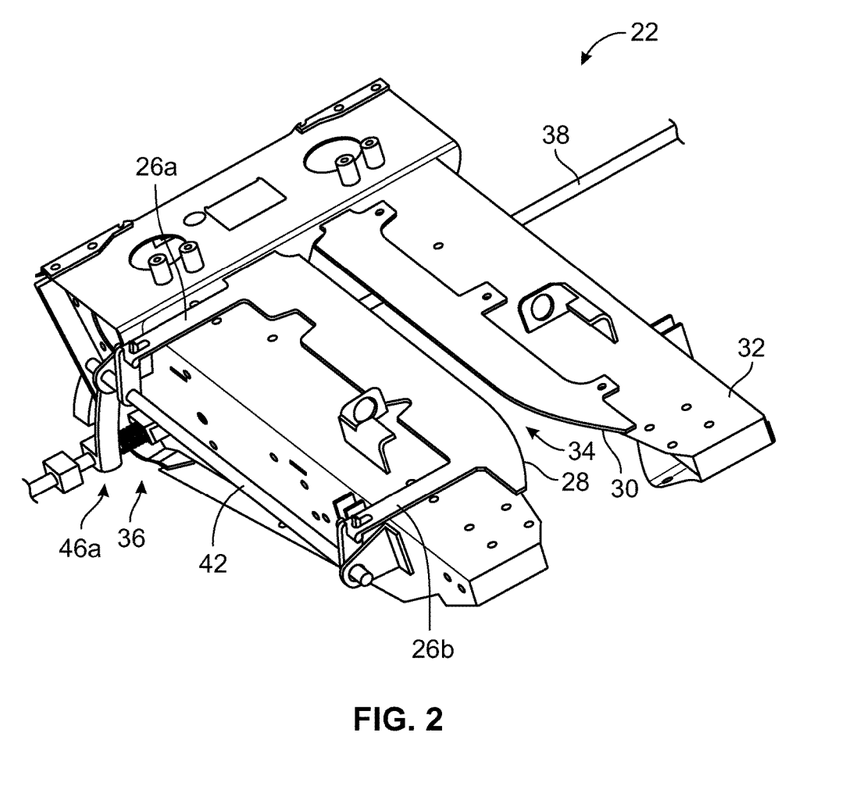
FIG. 2 is a top perspective view of a row unit of a corn header in accordance with the subject application.

Then during harvesting operations e.g., of corn, as stalks of corn with stalk widths greater than the predetermined gap size enter the gap it causes the first deck plate to freely move outwardly or laterally so as to easily accommodate the stalk within the row unit. In other words, the deck plates automatically adjusts its gap width to accommodate stalks of varying width to facilitate harvesting.

As the first deck plate moves outwardly, the adjuster arm moves inwardly or medially thereby biasing the biasing member. Then when the stalk exists the gap, the biasing member biases the adjuster arm and consequently the first stripping plate back to the predetermined position corresponding to the predetermined gap size.

The foregoing row unit of the subject application therefore advantageously provides for a self-adjusting deck plate that can easily accommodate stalks of varying width and which can operate independently of the other row units of the header. That is, each row unit can operate independent of any other respective row unit with respect to self-adjusting the size of the gap between stripping plates.

In an aspect of the subject application, movement of the first and second stripping plates are controlled by the control arm which in turn is actuated by an actuator e.g., a hydraulic cylinder, an electrical linear or rotary actuator or the like, that can be remotely controlled by a user from the cab. The actuator is pivotally connected to the control arm with an opposite end connected in a fixed and stationary position. For example, the control arm can be connected to an actuator via a pivoting linkage arrangement controllably operable for moving the deck plates toward and away from each other for varying the width or gap therebetween. A representative actuator can comprise, for instance, a fluid cylinder operable to extend and retract to the pivot linkage arrangement about a fixed element of the row unit frame under control of a pressurized fluid system of the combine, which can include a valve arrangement connected to the actuator via fluid lines in a closed loop system utilizing a resolver or the like for determining the position of the actuator, and thus the position of the deck plates. Additionally, it should be noted that the linkage arrangement can be configured such that one actuator moves all or several of the deck plates of the header, or each row unit can have a dedicated actuator. Further details with respect to the hydraulic system applicable to the subject application are disclosed in U.S. Pat. No. 8,224,534, the entire disclosure of which is hereby incorporated by reference for all purposes.

It will be appreciated by those skilled in the art that changes could be made to the embodiments described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A row unit of an agricultural harvester comprising:
    first and second longitudinally extending stripping plates mounted on a frame and having opposed stripping edges which define a gap between them; and
    a gap adjustment mechanism that adjusts a size of the gap between the first and second stripping plates comprising:
        a control arm,
        a rocker assembly operatively connected to one of the first and second stripping plates and slidably connected to the control arm, and
        a biasing member that biases the rocker assembly slidably along the control arm.

2. The row unit of claim 1, wherein the rocker assembly comprises:
    a rocker shaft connected to said one of the first and second stripping plates; and
    an adjuster arm having a first end rigidly connected to the rocker shaft, and an opposite end slidingly connected to the control arm.

3. The row unit of claim 1, wherein the biasing member is a spring, an elastomer, or a magnet.

4. The row unit of claim 3, wherein the spring is a coil spring circumscribing the control arm.

5. The row unit of claim 1, wherein the gap adjustment mechanism further comprises a second rocker assembly operatively connected to the other of the first and second stripping plates.

6. The row unit of claim 1, wherein the control arm extends in a direction substantially transverse to a longitudinal direction of the row unit.

7. The row unit of claim 1, wherein the rocker assembly is slidable along a longitudinal axis of the control arm.

8. A row unit of an agricultural harvester comprising:
first and second longitudinally extending stripping plates mounted on a frame and having opposed stripping edges which define a gap between them; and
an adjustment mechanism pivotably connected to one of the first and second stripping plates, the adjustment mechanism comprising:
a control arm,
a linkage assembly slidably connected to the control arm and pivotably connected to said one of the first and second stripping plates, and
a biasing member for biasing the linkage assembly slidably along the control arm.

9. The row unit of claim 8, wherein the linkage assembly comprises:
a first linkage connected to said one of the first and second stripping plates; and
a second linkage connected to the first linkage and the control arm.

10. The row unit of claim 9, wherein the second linkage is slidably connected to the control arm and rigidly connected to the first linkage.

11. The row unit of claim 8, wherein the adjustment mechanism further comprises a pair of stops along the control arm about opposite sides of the linkage assembly.

12. The row unit of claim 11, wherein each of the pair of stops is fixedly attached to the control arm about a lateral side of the frame of the row unit.

13. The row unit of claim 8, wherein the biasing member is a spring, an elastomer, or a magnet.

14. The row unit of claim 8, wherein the adjustment mechanism further comprises a second linkage assembly operatively connected to the other of the first and second stripping plates.

15. The row unit of claim 8, wherein the control arm extends in a widthwise direction of the row unit.

16. The row unit of claim 8, wherein the linkage assembly is slidable along a longitudinal axis of the control arm.

17. A row unit of an agricultural harvester comprising:
first and second longitudinally extending stripping plates mounted on a frame and having opposed stripping edges which define a gap between them; and
a gap adjustment mechanism that adjusts a size of the gap between the first and second stripping plates comprising:
a control arm,
a rocker assembly operatively connected to one of the first and second stripping plates and connected to the control arm, including:
a rocker shaft connected to said one of the first and second stripping plates, and
an adjuster arm having a first end rigidly connected to the rocker shaft and an opposite end slidingly connected to the control arm, and
a biasing member that biases the rocker assembly slidably along the control arm.

18. The row unit of claim 17, wherein the rocker assembly further comprises a pair of stops along a length of the control arm about opposite sides of the adjuster arm and the biasing member.

19. The row unit of claim 17, wherein the rocker assembly further comprises a pair of stops along a length of the control arm about opposite sides of the adjuster arm.

20. The row unit of claim 19, wherein the length corresponds to a range of gap sizing between the first and second stripping plates.

21. The row unit of claim 19, wherein the adjuster arm slides along the length of the control arm and is biasable by the biasing member.

22. The row unit of claim 19, wherein the pair of stops is fixedly attached to the control arm.

23. The row unit of claim 19, wherein each of the pair of stops is fixedly attached to the control arm about a lateral side of the frame of the row unit.

24. A row unit of an agricultural harvester comprising:
first and second longitudinally extending stripping plates mounted on a frame and having opposed stripping edges which define a gap between them; and
a gap adjustment mechanism that adjusts a size of the gap between the first and second stripping plates comprising:
a control arm,
a rocker assembly operatively connected to one of the first and second stripping plates and slidable along the control arm, and
a biasing member that biases the rocker assembly slidably along the control arm.

* * * * *